(12) United States Patent
Grandin et al.

(10) Patent No.: US 10,096,115 B2
(45) Date of Patent: Oct. 9, 2018

(54) BUILDING A DEPTH MAP USING MOVEMENT OF ONE CAMERA

(71) Applicant: BlackBerry Limited, Waterloo (CA)

(72) Inventors: Thomas Guillaume Grandin, Kitchener (CA); Sui Tong Tang, Waterloo (CA); Sung Ho Hong, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 186 days.

(21) Appl. No.: 14/683,400

(22) Filed: Apr. 10, 2015

(65) Prior Publication Data

US 2015/0294474 A1 Oct. 15, 2015

(30) Foreign Application Priority Data

Apr. 11, 2014 (CA) ...................................... 2848794

(51) Int. Cl.
| | |
|---|---|
| *G06T 7/00* | (2017.01) |
| *H04N 13/221* | (2018.01) |
| *H04N 13/264* | (2018.01) |
| *G06T 7/579* | (2017.01) |

(52) U.S. Cl.
CPC ............ *G06T 7/0071* (2013.01); *G06T 7/579* (2017.01); *H04N 13/221* (2018.05); *H04N 13/264* (2018.05); *G06T 2207/10016* (2013.01)

(58) Field of Classification Search
None
See application file for complete search history.

(56) References Cited

U.S. PATENT DOCUMENTS

| 6,639,596 | B1 * | 10/2003 | Shum ..................... | G06K 9/209 345/427 |
|---|---|---|---|---|
| 2006/0203335 | A1 * | 9/2006 | Martin ............... | G02B 27/2214 359/462 |
| 2008/0278569 | A1 * | 11/2008 | Rotem ............... | H04N 13/0221 348/43 |
| 2009/0167923 | A1 * | 7/2009 | Safaee-Rad ........ | H04N 5/23212 348/345 |
| 2010/0316282 | A1 | 12/2010 | Hope | |

(Continued)

FOREIGN PATENT DOCUMENTS

| EP | 2533199 | 12/2012 |
|---|---|---|
| WO | 2014/027229 | 2/2014 |

OTHER PUBLICATIONS

Extended European Search Report in European Application No. 15163176.9, dated Jun. 17, 2015, 6 pages.
Office Action issued in Canadian Application No. 2,848,794 dated Aug. 8, 2014; 3 pages.

(Continued)

*Primary Examiner* — Mohammad J Rahman
(74) *Attorney, Agent, or Firm* — Fish & Richardson P.C.

(57) ABSTRACT

A method for building a depth map is operable on a mobile device having a single camera integrated therewith. The method includes capturing a plurality of images of a given view using movement of the mobile device between images, capturing data regarding the movement of the mobile device during capture of the plurality of images, determining a relative position of the mobile device corresponding to each of the plurality of images, and building a depth map using the plurality of images and the relative position corresponding to each of the plurality of images.

19 Claims, 2 Drawing Sheets

(56) References Cited

U.S. PATENT DOCUMENTS

| | | | |
|---|---|---|---|
| 2011/0025830 A1 | 2/2011 | McNamer et al. | |
| 2011/0050853 A1* | 3/2011 | Zhang | H04N 13/026 348/44 |
| 2011/0304706 A1 | 12/2011 | Border et al. | |
| 2012/0133746 A1 | 5/2012 | Bigioi et al. | |
| 2012/0163672 A1 | 6/2012 | McKinnon | |
| 2012/0188389 A1* | 7/2012 | Lin | H04N 5/2258 348/218.1 |
| 2012/0242796 A1* | 9/2012 | Ciurea | H04N 5/232 348/46 |
| 2013/0038696 A1* | 2/2013 | Ding | G02B 5/09 348/47 |
| 2013/0088489 A1* | 4/2013 | Schmeitz | H04N 5/2254 345/419 |
| 2013/0127988 A1 | 5/2013 | Wang et al. | |
| 2013/0202191 A1* | 8/2013 | Wang | H04N 13/0011 382/154 |
| 2014/0029837 A1 | 1/2014 | Venkatraman et al. | |
| 2014/0219581 A1* | 8/2014 | Astrand | G06T 3/4038 382/284 |
| 2015/0245013 A1* | 8/2015 | Venkataraman | G01P 3/38 348/48 |
| 2015/0373316 A1* | 12/2015 | Meng | H04N 13/0232 348/47 |

OTHER PUBLICATIONS

Office Action issued in Canadian Application No. 2,848,794 dated Jan. 23, 2015; 4 pages.
Communication Pursuant to Article 94(3) EPC issued in European Application No. 15163176.9 dated Nov. 17, 2017; 5 pages.

\* cited by examiner

BUILDING A DEPTH MAP USING MOVEMENT OF ONE CAMERA

CLAIM OF PRIORITY

This application claims priority to Canadian Patent Application No. 2,848,794 filed on Apr. 11, 2014, the entire contents of which are hereby incorporated by reference.

FIELD OF THE DISCLOSURE

The present disclosure generally relates to building a depth map of an image that is taken by a mobile device. More particularly, and not by way of any limitation, the present disclosure is directed to a mobile device and method for building a depth map using multiple images taken with a single camera on the mobile device and movement of the mobile device between the images.

BACKGROUND

Mobile devices, such as cellular telephones, commonly incorporate cameras for taking both still images and videos. Typically, the cameras integrated into these mobile devices have limited capabilities, such as a fixed focus or auto-focus, a large depth of field and a limited range of exposure times. In order to enhance photographs taken with such a camera, it is known to build or simulate a depth map of an image. A depth map can be a representation of an image in which different values or colors represent different distances from the camera of the objects in that image. For example, depth maps can be built using colors or shades of gray to represent distances from the camera. The depth map can provide accurate values of distances or values representing relative distances of the objects to the camera without knowing accurately the real distance. Once created, the depth map can be used to perform several types of post-processing on the original image. For example, one can simulate a shallower depth of field in an image by maintaining a sharp image of objects at a given distance from the camera, while blurring objects at other distances. Other examples of processing using a depth map include measuring distances and/or objects in an image and separating objects from the background.

BRIEF DESCRIPTION OF THE DRAWINGS

A more complete understanding of the embodiments of the present disclosure may be had by reference to the following Detailed Description when taken in conjunction with the accompanying drawings wherein.

DETAILED DESCRIPTION OF THE DRAWINGS

Figure 1:
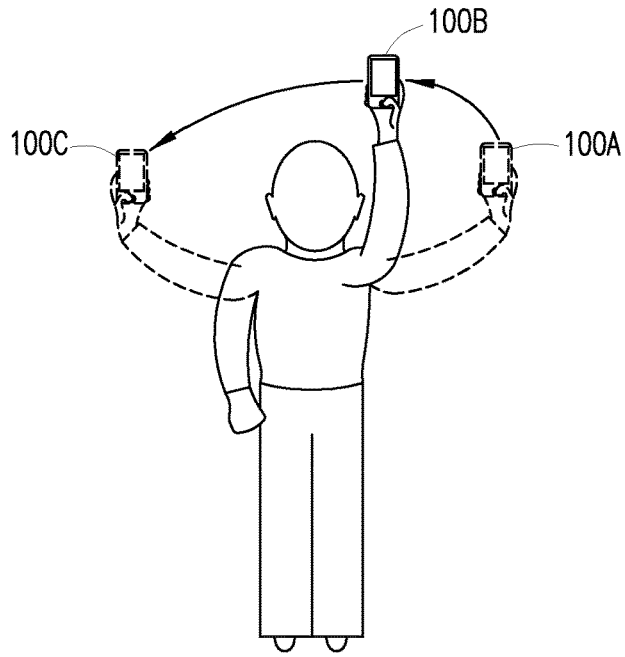
FIG. 1 depicts a mobile device that includes a camera being used in an example way to capture multiple images according to an embodiment of the disclosure.

The present disclosure is broadly directed to a method and device for building a depth map of an image using a single camera and movement of the camera. The present disclosure is also directed to associated computer-accessible media, computer programmable products and various software/firmware components relative to the disclosed method for building a depth map.

In one aspect of the present disclosure, a method operable on a mobile device is disclosed. The method includes capturing, with a single camera integrated with the mobile device, a plurality of images of a given view using movement of the mobile device between images; capturing data regarding the movement of the mobile device during capture of the plurality of images; determining a relative position of the mobile device corresponding to each of the plurality of images; and building a depth map using the plurality of images and the relative position corresponding to each of the plurality of images.

In one aspect of the present disclosure, a non-transitory computer-readable medium is disclosed. The non-transitory computer-readable medium contains instructions that when executed by a processor cause the processor to perform a method comprising capturing, using a single camera integrated with the mobile device containing the processor, a plurality of images of a given view using movement of the mobile device between images; capturing data regarding the movement of the mobile device during capture of the plurality of images; determining a relative position of the mobile device corresponding to each of the plurality of images; and building a depth map using the plurality of images and the relative position corresponding to each of the plurality of images.

In one aspect of the present patent disclosure, a mobile device is disclosed. The mobile device includes a camera that is connected to a memory and configured to store images created by the camera in the memory; an accelerometer operable to detect movement of the mobile device in three dimensions; and a processor operably coupled to the accelerometer and to the memory, the memory storing instructions that when executed by the processor, causes the camera to capture a plurality of images of a given view using movement of the mobile device between images, causes the accelerometer to capture data regarding the movement of the mobile device during capture of the plurality of images, determines a relative position of the mobile device corresponding to each of the plurality of images, and builds a depth map using the plurality of images and the relative position corresponding to each of the plurality of images.

To create a depth map, it is known to use a stereo camera, i.e., a camera that has two separate lenses with separate photo-sensor arrays arranged to simultaneously create two images of a scene. The images thus created are compared to determine the displacement of recognizable portions of the image between the images, i.e., how far the edges of an object move from one image to the second. The displacement of objects between the images combined with the known distance between the two cameras provides the information to create an accurate depth map of the scene. An example of the use of a stereo camera to create a depth map is discussed in U.S. Patent Application Publication 2012/0019688, which is owned by the assignee of the present application and which is incorporated by reference herein. This patent publication also discloses that a depth map can be created by taking two or more consecutive images at different convergence planes, i.e., with the focus on objects at different distances from the camera. A depth map can also be simulated by a user outlining objects in an image that should be placed in various layers, but this requires specific inputs from the user. The present application discloses another method of building an accurate depth map that can be used to process images taken on the mobile device.

Using the disclosed method and mobile device, the user captures several images of the same scene, translating the device between each shot to create a parallax between the different images. The user can capture two images with a degree of separation that is suited to the relative distances involved or can capture three or more images on two different axes—horizontal and vertical—to build a depth map using depth on two axes. The mobile device is configured to include and execute a depth-map application that can operate in several ways. In at least one embodiment, the user takes an initial image of a view, then moves the mobile device a given distance to frame an additional image of the view; multiple moves can provide additional images of the view. In at least one alternate embodiment, the depth-map application automatically captures a sequence of images while the user moves the mobile device, in a manner similar to shooting a panorama. The movement can be in an L-shape, a cross, a circle, or any other desired movement, as long as there is a translation involved between each capture. For the purposes of this application, it will be understood that the described movement is substantially in a plane that is parallel to the scene being imaged, as the movement is made to gain parallax between the views.

In at least one embodiment, the mobile device also contains one or more sensors that provide information regarding the orientation and movement of the mobile device. In at least one embodiment, the one or more sensors include an accelerometer. An accelerometer converts acceleration from motion and gravity, which are detected by a sensing element, into an electrical signal, which can be digital or analog, depending on the type of accelerometer. In at least one embodiment, the accelerometer detects and measures acceleration in three dimensions. The accelerometer can also be used to derive information regarding the orientation of the mobile device with regard to tilt and/or rotation of the mobile device, or this information can be provided by another type of sensor, such as a gyroscopic sensor or a tilt sensor. Using the available sensors, the depth-map application on the mobile device can accurately determine the relative position of each subsequent image in relationship to the original image and can further determine the orientation of the mobile device when each image is taken. This knowledge of the position of the mobile device at the capture of images increases the accuracy of the depth map, as well as improving the speed of calculations. In another embodiment, the device captures a sequence of images or a video using its camera, but without the use of sensors. The device then calculates motion vectors in different areas of each image in order to compensate the rotation, translation and perspective distortion of the device during the movement. It will be understood that the use of such calculations instead of the disclosed sensors can greatly increase the time needed for the application to perform. Several frames of the same video can then be used to build the depth map.

The depth-map application builds a depth map from the captured images in the following manner. First, the images are compared to each other, with orientation and movement compensation; these techniques are similar to digital video stabilization methods. The depth map is analyzed, using the movement, e.g., of the edges of objects, due to the change of parallax; this analysis uses standard stereo correspondence techniques such as basic block matching. In at least one embodiment more than two images are compared in order to increase the accuracy and resolution of the depth map. In at least one embodiment, the relative position information calculated or determined during the movement is used to analyze the dimensions and distances in the image. Once the depth map is created, it may be used for example to determine the size of objects in the image (if accurate distances from the camera were determined), to separate objects from the background, and to process the images, e.g., to refocus on one object only, change the brightness or colors of that object, apply different filters to one object compared to the background, move and merge several objects on a different background, etc. In at least one embodiment, the sharpest image is used as a reference and the others are used only for depth map calculation. The rotation or tilt of the mobile device that is captured at the time of the images can be used in several different ways. In at least one embodiment, when a difference in the tilt or rotation of the mobile device is present between multiple images, an informational message can be provided to the user, e.g. to suggest that images be retaken without the tilt/rotation. In at least one embodiment, the depth-map application uses the knowledge of the tilt/rotation to compensate for the rotation when processing the images.

A system and method of the present patent disclosure will now be described with reference to various example embodiments. Like reference numerals are used throughout the description and several views of the drawings to indicate like or corresponding parts, wherein the various elements are not necessarily drawn to scale. Referring now to the drawings, and more particularly to FIG. 1, an example of a mobile device with a camera is illustrated during capture of multiple images of a single scene. In the illustrated embodiment, the mobile device 100 is moved along a plane in a path shown as a large semi-circle. During movement the mobile device 100 captures pictures of a scene at three points—to the user's right 100A, overhead 100B, and to the user's left 100C. This example movement is designed to be able to capture parallax in images taken from a fairly large distance. Images that seek to capture nearer objects would use correspondingly smaller movements. Note that the movements illustrated in this figure are two dimensional, i.e., they include both vertical and horizontal movement of the mobile device during the image capture, but do not generally include movements toward or away from the scene—i.e. in the direction in which the camera is pointing. It will be understood that the movement shown is for illustration only and is not limiting, since many other curvilinear movements can be used. A depth map can be built from two images taken some distance apart, as this provides parallax between the two images. When three or more images are used to build the depth, parallax can be gained in both the horizontal and vertical direction. As mobile device 100 captures images at each of the illustrated positions of FIG. 1, the mobile device also uses a sensor to determine the relative position of the mobile device in relation to the position when the initial image is taken. In at least one embodiment, the sensor is an accelerometer that determines the direction of motion and the acceleration to which the mobile device is subjected and translates this motion into relative position.

Figure 2:
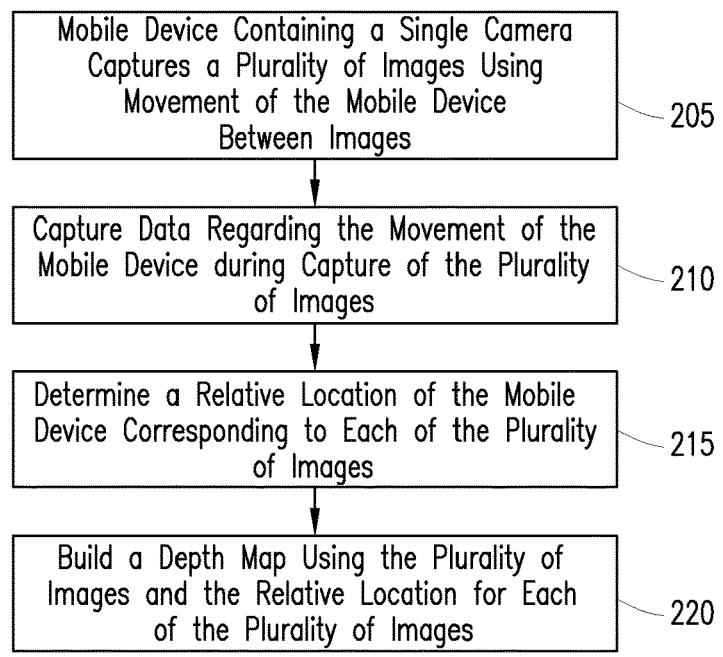
FIG. 2 depicts a flowchart of an example method of building a depth map according to an embodiment of the disclosure.

Turning next to FIG. 2, a flowchart of an example method of building a depth map is shown according to an embodiment of the disclosure. The method begins when the user activates the depth-map application or still/video image-capture application that includes the depth map-building feature/functionality. At block 205, mobile device containing the depth-map application uses a single camera to acquire a plurality of images of a given view using movement of the mobile device between images. In at least one embodiment, the application acquires the plurality of images as the user manually takes a number of pictures, moving the mobile device and its camera between each shot. In at least one embodiment, the depth-map application automatically acquires the plurality of images once the image acquisition is initiated. At block 210, the depth-map application captures data regarding the movement of the mobile device during the capture of the plurality of images. In at least one embodiment, this movement information is received from an accelerometer. This data can include the acceleration of the mobile device, how long the acceleration lasted and the direction of movement. This data is captured while the plurality of images is being captured, so that the image data and the movement data can be correlated. At block 215, the depth-map application determines the relative position of the mobile device corresponding to each of the plurality of images, i.e., at the time each image was captured. In at least one embodiment, the position of the mobile device when the first image taken is used as the initial position, with subsequent positions determined in relation to the initial position reference. At block 220, the depth-map application builds a depth map using the plurality of images and the relative position for each of the plurality of images. Known algorithms for building a depth map can be utilized. The subsequent positions can vary with the user movements, in contrast with standard stereoscopic cameras in which the distance is fixed and known before the capture. Depth maps can be built that provide accurate depth information for both close-up images and images of distant landscapes, simply by adjusting the distance the mobile device and its camera are moved. That is to say, a first depth map may be constructed using subsequent positions that are close to the initial position for accuracy in close-up images, whereas a second depth map may be constructed using subsequent positions that are farther from the initial position for accuracy in images of distant landscapes. Within one large movement, the device can choose the different images depending upon the relative position between those images in order to be able to calculate the depth map for both close and far objects.

Figure 3:
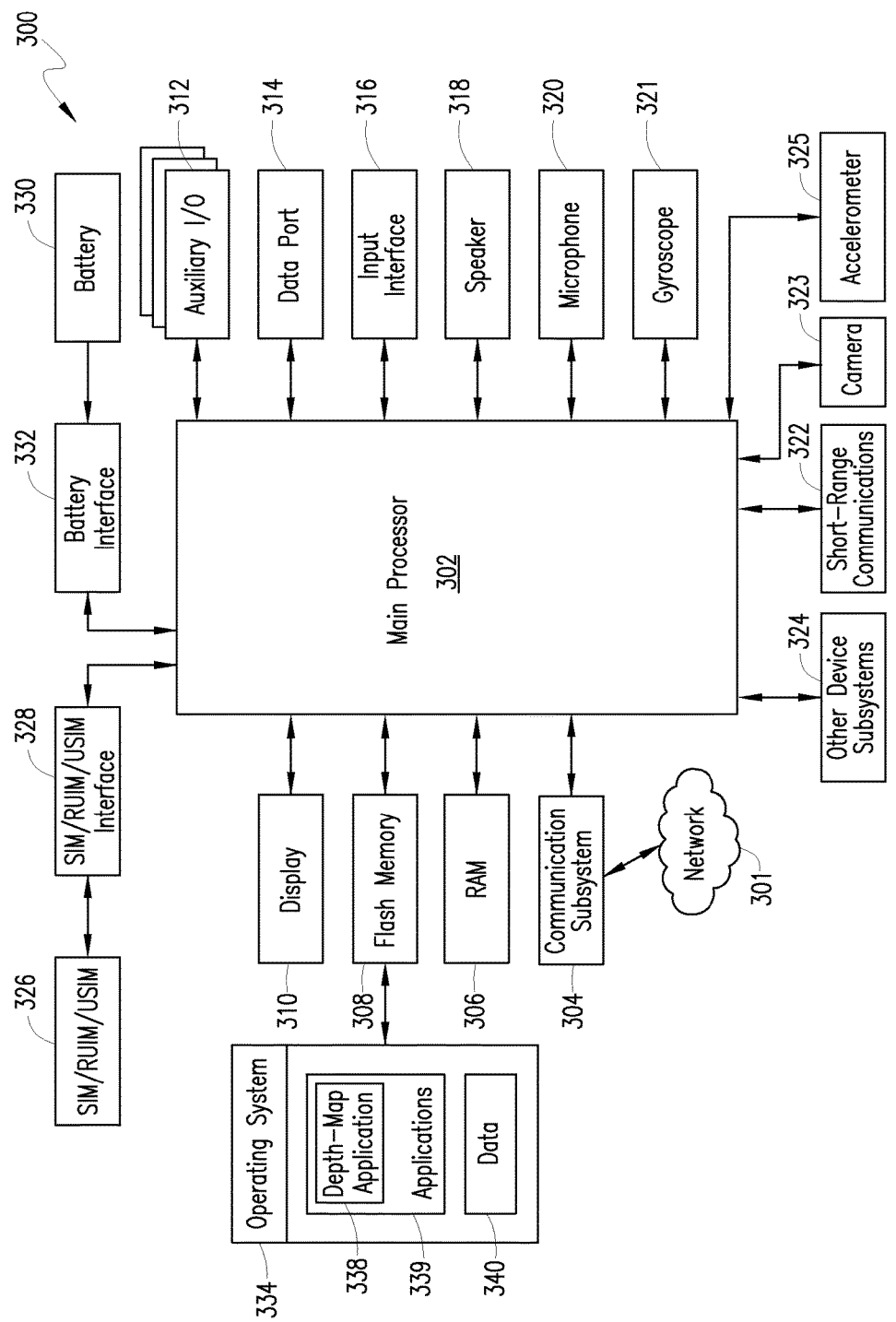
FIG. 3 depicts a block diagram of an example mobile device according to an embodiment of the disclosure.

Referring next to FIG. 3, shown therein is a block diagram of an example embodiment of a mobile device 300, which can be used to create the disclosed depth map. Mobile device 300 can be any type of mobile device that includes a camera and the previously-described motion sensors. In the embodiment disclosed in FIG. 3, mobile device 300 is a wireless telephone capable of operating in both wide-area cellular networks and in a variety of short-range networks, such as local area networks (LANs), WiFi, Bluetooth®, etc. Mobile device 300 comprises a number of components such as a main processor 302 that controls the overall operation of mobile device 300. Communication functions, including data and voice communications, are performed through communication subsystem 304. Communication subsystem 304 receives messages from and sends messages to a wireless network 301. In this example embodiment of mobile device 300, communication subsystem 304 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behavior described herein, and it will also be understood by persons skilled in the art that the embodiments described herein are intended to use any other suitable standards that are developed in the future. The wireless link connecting communication subsystem 304 with wireless network 301 represents one or more different Radio Frequency (RF) channels, operating according to defined protocols specified for GSM/GPRS communications.

Main processor 302 also interacts with additional subsystems such as Random Access Memory (RAM) 306, flash memory 308, display 310, auxiliary input/output (I/O) subsystem 312, data port 314, input interface 316, speaker 318, microphone 320, gyroscope 321, short-range communications subsystem 322, camera 323, accelerometer 325, and other device subsystems 324. The display 310 can be a touch-screen display able to receive inputs through a user's touch. Some of the subsystems of mobile device 300 perform communication-related functions, whereas other subsystems may provide "resident" or on-device functions. By way of example, display 310 and input interface 316 may be used for both communication-related functions, such as entering a text message for transmission over network 301, and device-resident functions such as a calculator or task list.

Mobile device 300 can send and receive communication signals over wireless network 301 after required network registration or activation procedures have been completed. Network access is associated with a subscriber or user of mobile device 300. To identify a subscriber, mobile device 300 may use a subscriber module component or "smart card" 326, such as a Subscriber Identity Module (SIM), a Removable User Identity Module (RUIM) and a Universal Subscriber Identity Module (USIM). In the example shown, SIM/RUIM/USIM 326 is to be inserted into SIM/RUIM/USIM interface 328 in order to communicate with a network. Without the component 326, the mobile device 300 is not fully operational for communication with wireless network 301. Once SIM/RUIM/USIM 326 is inserted into SIM/RUIM/USIM interface 328, it is coupled to main processor 302.

Mobile device 300 is a battery-powered device and includes battery interface 332 for receiving one or more rechargeable batteries 330. In at least some embodiments, battery 330 can be a smart battery with an embedded microprocessor. Battery interface 332 is coupled to a regulator (not shown), which assists battery 330 in providing power to mobile device 300. Although current technology makes use of a battery, future technologies such as micro fuel cells may provide power to mobile device 300.

Mobile device 300 also includes an operating system 334 and applications 339, including a camera application (not shown) and a depth-map application 338 which is described in more detail herein. Operating system 334 and the applications that are executed by main processor 302 are typically stored in a persistent store such as flash memory 308, which may alternatively be a read-only memory (ROM) or similar storage element (not shown). Those skilled in the art will appreciate that some portions of operating system 334 and applications 339, such as specific device applications or parts thereof as well as data 340 relating to or associated with specific applications, may be temporarily loaded into a volatile store such as the RAM 306. Other software components can also be included, as is well known to those skilled in the art.

Other types of applications 339 can also be installed on mobile device 300. Software applications 339 can be pre-installed applications or third party applications that are added after the manufacture of mobile device 300. Examples of third party applications include games, calculators, utilities, etc. Additional applications 339 can be loaded onto mobile device 300 through at least one of the wireless network 301, auxiliary I/O subsystem 312, data port 314, short-range communications subsystem 322, or any other suitable device subsystem 324. Data port 314 can be any suitable port that enables data communication between mobile device 300 and another computing device. Data port 314 can be a serial or a parallel port. In some instances, data port 314 can be a USB port that includes data lines for data transfer and a supply line that can provide a charging current to charge battery 330 of mobile device 300. For voice communications, received signals are output to speaker 318, and signals for transmission are generated by microphone 320. Although voice or audio signal output is accomplished primarily through speaker 318, display 310 can also be used to provide additional information such as the identity of a calling party, duration of a voice call, or other voice call related information.

In at least one embodiment of mobile device 300, camera 323 is a color camera configured to capture color images. More particularly, color camera 323 can include a color sensor that is capable of capturing color information of a scene to produce a color image. For example, the color sensor may include an image sensor and a color filter array. The image sensor receives and converts optical images into electronic signals that convey image information. The color filter array is a mosaic of tiny color filters placed over pixels of the image sensor to capture color information. The color filters filter light from a scene by wavelength range so that filtered wavelengths that provide corresponding color information are captured by different pixels on the image sensor. That is, a particular type of color information may be captured at a pixel of the image sensor based on the overlaying color filter. Accordingly, only certain amounts of incoming light are captured by the image sensor as the pixels only receive those portions of light that have been filtered based on color. The use of a color sensor results in a loss of image detail when compared to an achromatic sensor of a monochrome camera, as each pixel of the color sensor corresponds to only one particular color for filtering light. In at least one embodiment, camera 323 is a monochrome camera.

Additionally, in at least one embodiment, camera 323 is equipped with an auto-focusing system. That is, camera 323 has the ability to change the lens position and/or optical image position with respect to the image sensor in order to focus on an image. In such cases, as part of the auto-focusing system, the camera may include components (such as actuators) that may move the lens in relation to the image sensor in order to focus on an image. In at least one embodiment, camera 323 is fixed-focus. That is, camera 323 may not have the ability to change the lens and/or optical image position in relation to the image sensor in order to focus on an image. The distance between the image sensor and the lens may not be varied. In such cases, the fixed-focus camera captures images at its pre-set focusing distance, and may not be able to focus on an image. The fixed-focus camera may not include components (such as actuators) that may move the lenses in relation to the image sensor to change the distance between the lenses and the image sensor.

Depth-map application 338 can be configured to control options or features associated with camera 323. For example, depth-map application 338 can trigger the camera and choose specific camera modes. In at least one embodiment, depth-map application 338 is configured to control a flash associated with camera 323. In at least one embodiment, depth-map application 338 is configured to allow camera 323 to focus on a subject (i.e. an identifiable item, such as an individual or thing). For example, camera 323 may be configured to control actuators to move one or more lens elements in camera 323 relative to the image sensors in camera 323, i.e. vary the focal lengths of camera 323. In at least one embodiment, depth-map application 338 controls auto-focusing capabilities. For example, depth-map application 338 may analyze received electronic signals to determine whether the image captured by camera 323 is in focus and may determine whether the images defined by electronic signals received from camera 323 are focused properly on the subject of such images. Depth-map application 338 may, for example, make this determination based on the sharpness of such images. If depth-map application 338 determines that the images are not in focus, then depth-map application 338 may cause processor 302 to adjust one or more of the actuators which controls the lenses to focus the images. In at least one embodiment, other components of cameras 323 may additionally or instead of the lenses, be controlled for focusing purposes (e.g. adjusting a line of sight of camera 323). For example, one or more of camera 323 may include an adjustable tilting device coupled to the image sensor in order to adjust the line of sight of the cameras.

In at least one embodiment, depth-map application 338 may not provide for focusing capabilities. That is, the focusing distance of camera 323 may not be adjusted, and images are captured at pre-configured focusing distances for camera 323. More particularly, camera 323 does not include controllable components (such as actuators), and the distance between the lenses and the image sensor may not be adjusted. Similarly, other controllable features (such as a tilting device) may not be present within camera 323.

Various processes, structures, components and functions set forth above in detail, associated with one or more embodiments of a depth-map application, may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a non-transitory computer-accessible media, uploadable service application software, or software downloadable from a remote station or service provider, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. In one embodiment, transmission media may include carrier waves or other signal-bearing media. As used herein, the phrase "computer-accessible medium" encompasses "computer-readable medium" as well as "computer executable medium."

It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:

1. A method operable on a mobile device, comprising:
 capturing, with a single camera integrated with the mobile device, at least three images of a given view using movement of the mobile device between images, wherein the at least three images comprise an initial image taken from an initial position, a first subsequent image taken from a first subsequent position offset from the initial position in both vertical and horizontal directions, a second subsequent image taken from a second subsequent position further from the initial position, and the initial position, the first subsequent position, and the second subsequent position are substantially in a plane parallel to the given view being captured;

capturing data regarding the movement of the mobile device during capture of the at least three images;

after capturing the at least three images, determining a relative position of the mobile device corresponding to each of the captured at least three images; and building a depth map for both close and far objects using the at least three images and the relative position corresponding to each of the at least three images.

2. The method as recited in claim 1 wherein determining the relative position of the mobile device corresponding to a given image comprises determining a distance moved by the mobile device since a previous image of the at least three images.

3. The method as recited in claim 2 wherein determining the relative position of the mobile device corresponding to the given image further comprises determining a direction of movement of the mobile device since the previous image of the at least three images.

4. The method as recited in claim 3 wherein determining the relative position of the mobile device corresponding to the given image uses information from an accelerometer.

5. The method as recited in claim 4 further comprising determining a rotation of the mobile device during movement of the mobile device between images and indicating the rotation to a user of the mobile device.

6. The method as recited in claim 1 further comprising determining a rotation of the mobile device during movement of the mobile device between images and compensating for the rotation when creating the depth map.

7. The method as recited in claim 1 further comprising using the depth map to perform one of measuring distances in the initial of the at least three images and measuring the size of objects in the initial image.

8. The method as recited in claim 1 further comprising using the depth map to perform post-processing of the initial image of the at least three images, the post-processing comprising separating objects from background in the initial image and changing a focus on specific objects of the initial image.

9. A non-transitory computer-readable medium containing instructions that when executed by a processor cause the processor to perform a method comprising:

capturing, with a single camera integrated with a mobile device, at least three images of a given view using movement of the mobile device between images, wherein the at least three images comprise an initial image taken from an initial position, a first subsequent image taken from a first subsequent position offset from the initial position in both vertical and horizontal directions, a second subsequent image taken from a second subsequent position further from the initial position, and the initial position, the first subsequent position, and the second subsequent position are substantially in a plane parallel to the given view being captured;

capturing data regarding the movement of the mobile device during capture of the at least three images;

after capturing the at least three images, determining a relative position of the mobile device corresponding to each of the captured at least three images; and building a depth map for both close and far objects using the at least three images and the relative position corresponding to each of the at least three images.

10. The non-transitory computer-readable medium as recited in claim 9 wherein determining the relative position of the mobile device corresponding to a given image comprises determining a direction of movement of the mobile device and a distance moved by the mobile device since a previous image of the at least three images.

11. The non-transitory computer-readable medium as recited in claim 9 wherein determining the relative position of the mobile device corresponding to the given image uses information from an accelerometer integrated with the mobile device.

12. The non-transitory computer-readable medium as recited in claim 9 further comprising determining a rotation of the mobile device during movement of the mobile device between images and compensating for the rotation when creating the depth map.

13. The non-transitory computer-readable medium as recited in claim 9 further comprising using the depth map to perform one of measuring distances in the initial image of the at least three images, measuring objects in the initial image, separating objects from background in the initial image and changing a focus on specific objects of the initial image.

14. A mobile device comprising:

a camera that is connected to a memory and configured to store images created by the camera in the memory;

an accelerometer operable to detect movement of the mobile device in three dimensions; and a processor operably coupled to the accelerometer and to the memory, the memory storing instructions that when executed by the processor, causes the camera to capture at least three images of a given view using movement of the mobile device between images, wherein the at least three images comprise an initial image taken from an initial position, a first subsequent image taken from a first subsequent position offset from the initial position in both vertical and horizontal directions, and a second subsequent image taken from a second subsequent position further from the initial position, and the initial position, the first subsequent position, and the second subsequent position are substantially in a plane parallel to the given view being captured, causes the accelerometer to capture data regarding the movement of the mobile device during capture of the at least three images, determines a relative position of the mobile device corresponding to each of the captured at least three images after the at least three images are captured, and builds a depth map for both close and far objects using the at least three images and the relative position corresponding to each of the at least three images.

15. The mobile device as recited in claim 14 wherein determining the relative position of the mobile device corresponding to a given image comprises determining a direction of movement of the mobile device and a distance moved by the mobile device since a previous image of the at least three images.

16. The mobile device as recited in claim 14 further comprising determining a rotation of the mobile device during movement of the mobile device between images and indicating the rotation to a user of the mobile device.

17. The mobile device as recited in claim 14 further comprising determining a rotation of the mobile device during movement of the mobile device between images and compensating for the rotation when creating the depth map.

18. The mobile device as recited in claim 14 further comprising using the depth map to perform one of measuring distances in initial image of the at least three images and measuring objects in the first image.

19. The mobile device as recited in claim 14 comprising using the depth map to perform post-processing of the initial image of the at least three images, the post-processing comprising one of separating objects from background in the initial image and changing a focus of the initial image.

* * * * *